(12) United States Patent
Findikli et al.

(10) Patent No.: US 6,415,144 B1
(45) Date of Patent: *Jul. 2, 2002

(54) SECURITY SYSTEM AND METHOD

(75) Inventors: Nadi Sakir Findikli; David Hoover, both of Cary, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,285

(22) Filed: Dec. 23, 1997

(51) Int. Cl.$^7$ .................................................. H04M 3/00
(52) U.S. Cl. ........................ 455/419; 455/410; 455/551
(58) Field of Search ................................ 455/410, 411, 455/432, 433, 434, 435, 32.1, 38.1, 551, 552, 565, 418, 419

(56) References Cited

U.S. PATENT DOCUMENTS

| | | | |
|---|---|---|---|
| 4,905,301 A | * 2/1990 | Krolopp et al. | 455/33.4 |
| 5,196,842 A | * 3/1993 | Gomez et al. | 455/525 |
| 5,297,268 A | * 3/1994 | Lee et al. | 395/425 |
| 5,581,803 A | * 12/1996 | Grube et al. | 455/38.1 |
| 5,594,945 A | * 1/1997 | Lewis et al. | 455/38.1 |
| 5,603,084 A | * 2/1997 | Henry, Jr. et al. | 455/419 |
| 5,722,084 A | * 2/1998 | Chakrin et al. | 455/551 |
| 5,784,693 A | * 7/1998 | Barber et al. | 455/434 |
| 5,881,235 A | * 3/1999 | Mills | 455/418 |
| 5,918,172 A | * 6/1999 | Saunders et al. | 455/404 |
| 5,943,425 A | * 8/1999 | Mizikovsky | 455/418 |
| 5,959,546 A | * 9/1999 | Dorenbosch | 455/31.3 |
| 6,014,561 A | * 1/2000 | Molne | 455/419 |
| 6,044,265 A | * 3/2000 | Roach, Jr. | 455/419 |
| 6,047,071 A | * 4/2000 | Shah | 455/410 |
| 6,055,442 A | * 4/2000 | Dietrich | 455/558 |

FOREIGN PATENT DOCUMENTS

| | | | | |
|---|---|---|---|---|
| WO | WO 94/30023 | * 12/1994 | | H04Q/7/04 |

* cited by examiner

Primary Examiner—Vivian Chin
Assistant Examiner—Duc Nguyen
(74) Attorney, Agent, or Firm—Myers Bigel Sibley & Sajovec

(57) ABSTRACT

A method of message management is provided for use with a mobile communications device having core and protected memories. The mobile communications device is in communication with a radio telecommunications system comprised of authorized and unauthorized radio telecommunications system operators, each operator have a unique identification code which is associated with messages communicated therefrom. The method of message management includes the step of storing the identification code of the authorized system operator in the core memory, receiving a message with an identification code associated therewith from the radio telecommunications system, and comparing the identification code of the message with the identification code of the authorized system operator. The method further includes the step of storing the message in the protected memory only if the identification code of the message matches the identification code of the authorized system operator. An apparatus is also provided for practicing the above mentioned method.

17 Claims, 4 Drawing Sheets

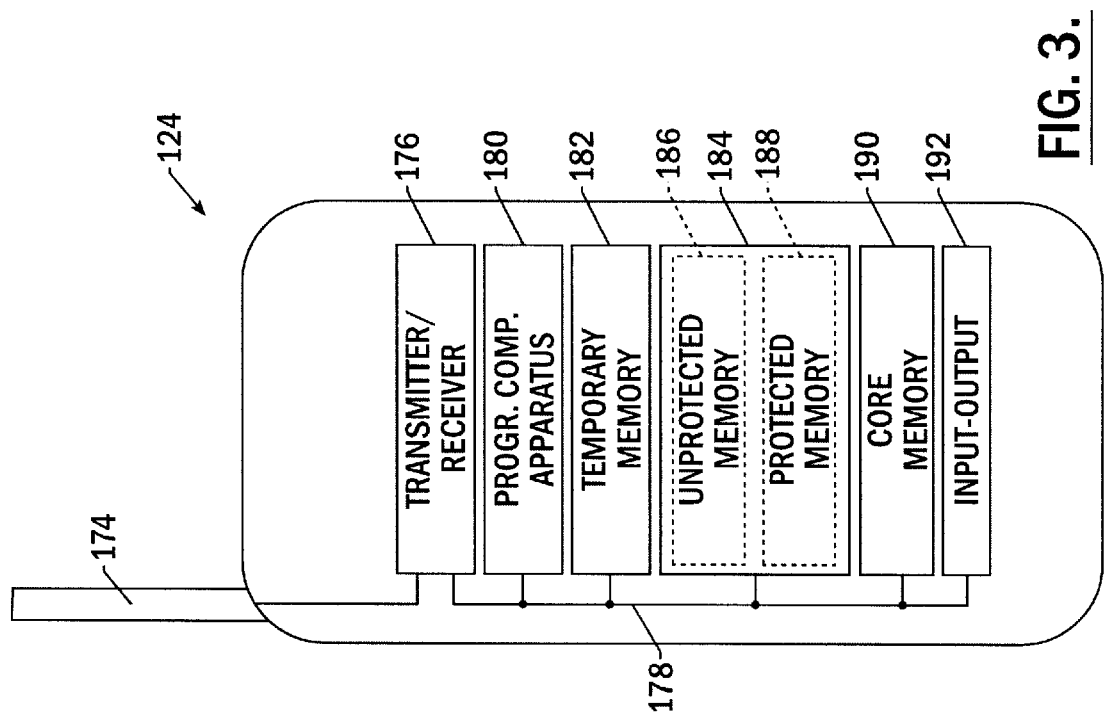
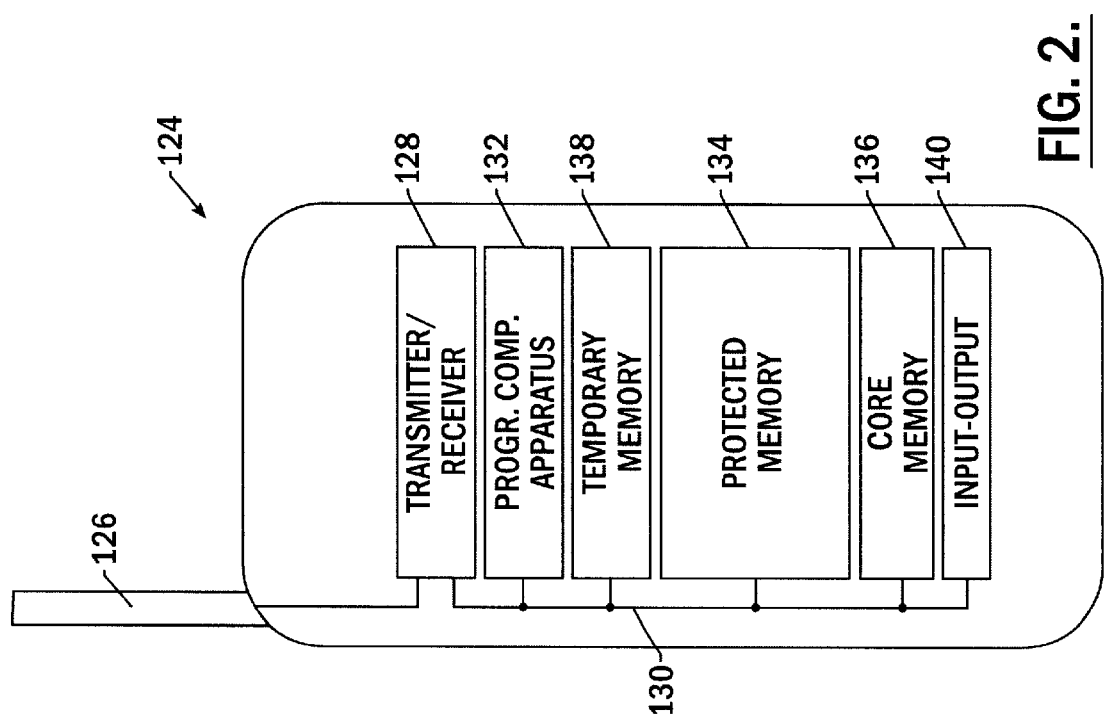

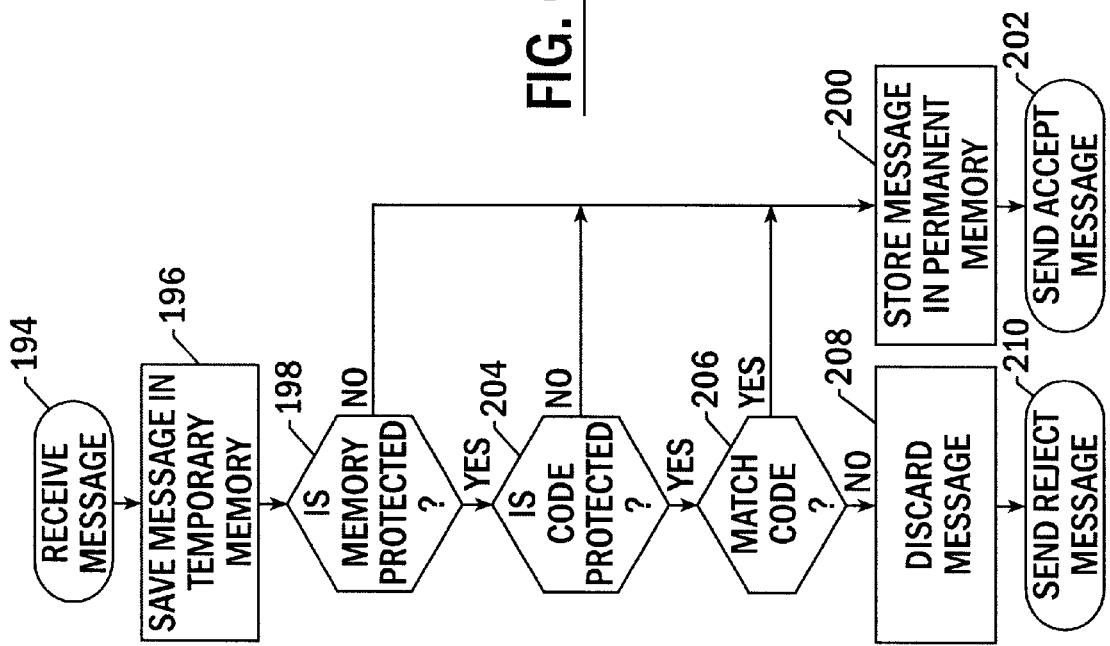

SECURITY SYSTEM AND METHOD

FIELD OF THE INVENTION

This invention is directed to a security system and a method for securing communications between a mobile communications device and one of a plurality of radio telecommunications service providers, and in particular, to a security system and a method for securing communications wherein messages from the one of the plurality of radio telecommunications service providers has a unique identification code associated therewith which is provided to the mobile communications device.

BACKGROUND OF THE INVENTION

In this age of radio telecommunications, one of the most important radio telecommunications devices is the mobile or cellular phone. At the present time, it is common for cellular phone service providers or system operators to offer significant bargains on the purchase of a cellular phone to encourage customers to sign up or subscribe to their cellular phone service for a fixed period of time. For example, it is not uncommon for cellular phone service providers to offer free cellular phones to prospective subscribers.

It is therefore of significant concern to cellular phone service providers that the cellular phones which they offer as a premium not be programmable for use with a competitor's cellular phone service until the service period of the contract has elapsed so as to allow the provider to recapture the cost of the phone. If the cellular phones could be easily reprogrammed to recognize and be used with a competitor's service, those system operators offering no or low cost cellular phones would lose a significant economic investment to service providers who choose not to offer premium pricing on cellular phones. As a consequence, it is presently highly desirable to provide some type of security measure to prevent the reprogramming of cellular phones.

One way in which a cellular phone can be protected against reprogramming is by "hard-coding" key or core service provider information into the cellular phone such that the phone only recognizes messages from the system operator which provides the phone, also referred to as the home system operator. Hard-coding refers to a parameter whose value is not variable, but is determined at the time a software program is written. Such hard coding would occur at the factory as the manufacture of the mobile phone is completed.

This solution is a rather extreme security measure. Hard-coding core information into a phone presents the same inflexibility to modification to the home system operator's programmer that it would to a competitor's programmer. To implement changes in the core information, it would be necessary to rewrite not just individual parameter values, but the software itself. This can result in significant hindrances in updating the core information.

Furthermore, it is now known in the art to provide over-the-air teleservices. An over-the-air teleservice is a service wherein the remote programming of cellular phones is achieved through the use of radio frequency messages.

There are two specific over-the-air teleservices which are coming into widespread use in the industry. The first teleservice is known as an over-the-air activation teleservice (OATS), and the second is known as an over-the-air programming teleservice (OPTS). Through OATS, a system operator can download core information to the mobile phone to configure the phone to be compatible with the system operator's service. Through OPTS, a system operator can, for example, download information on partner, favored, and forbidden radio telecommunications systems, which information may then be used by the cellular phone in selecting a service from the radio telecommunications systems.

These over-the-air teleservices provide the radio telecommunications system operators with greater flexibility in tailoring cellular phones to meet the needs of their subscribers. It would not be possible to use these, however, if the phones had been hard-coded to prevent overwrites.

SUMMARY OF THE INVENTION

According to an aspect of the invention, a method of message management is provided for use with a mobile communications device having a core memory and a protected memory. The mobile communications device is in communication with a radio telecommunications system comprised of an authorized radio telecommunications system operator and an unauthorized radio telecommunications system operator. The authorized and unauthorized radio telecommunications system operators each have a unique identification code which is associated with messages communicated therefrom. The method of message management includes the step of storing the identification code of the authorized radio telecommunications system operator in the core memory. The method further includes the steps of receiving a message with an identification code associated therewith from the radio telecommunications system, and comparing the identification code of the message with the identification code of the authorized radio telecommunications system stored in the core memory if the message is to be stored in the protected memory. The method further includes the step of storing the message in the protected memory only if the identification code of the message matches the identification code of the authorized radio telecommunications system operator stored in the core memory.

Moreover, the method may include the step of transmitting a reject-message signal to the radio telecommunications system if the message is not stored in the protected memory.

Moreover, wherein the mobile communications device has an unprotected memory, the method may include the steps of determining if the message is to be stored in the protected memory or the unprotected memory, and storing the message in the unprotected memory if the message is to be stored in the unprotected memory. The method may also include the step of transmitting an accept-message signal to the radio telecommunications system if the message is stored either in the protected memory or the unprotected memory.

Moreover, the message may be an over-the-air-activation message and the identification code associated with the message may be a system operator code identifying an authorized or an unauthorized radio telecommunications system operator.

Moreover, the message may be an over-the-air-programming message having information regarding the bands of the authorized and unauthorized radio telecommunications service providers and the identification code associated with the message are the values of a predetermined sequence of bands representative of an authorized or an unauthorized radio telecommunications system operator.

In another aspect of the invention, a mobile communications device is provided for use with a radio telecommunications system. The radio telecommunications system includes an authorized radio telecommunications system operator and an unauthorized radio telecommunications system operator. The authorized and unauthorized radio telecommunications system operators each have a unique identification code which is associated with messages communicated therefrom. The mobile communications device includes a receiver to receive messages from a radio telecommunications network. The device also includes a core memory with an identification code stored therein, the identification code associated with an authorized radio telecommunications system operator, a protected memory, and a programmable computational apparatus coupled to the receiver and the core memory. The mobile communications device further has a message management program operating in the programmable computational apparatus, wherein the message management program controls the programmable computational apparatus to compare an identification code of a message received by the receiver with the identification code of the authorized radio telecommunications system operator stored in the core memory if the message is to be stored in the protected memory. The message management program also operates in the programmable computational apparatus to store the message in the protected memory only if the identification code of the message matches the identification code of the authorized radio telecommunications system operator stored in the core memory.

Moreover, the mobile communications device may have an unprotected memory, wherein the message management program controls the programmable computational apparatus to determine if a message is to be stored in the protected memory or the unprotected memory. The message management program also controls the programmable computational apparatus to store the message in the unprotected memory if the programmable computational apparatus determines that the message is to be stored in the unprotected memory. The mobile communications device may also have a transmitter to transmit an accept-message signal to the telecommunications system, wherein the data management program controls the programmable computational apparatus to provide an accept-message signal to the transmitter if the message is stored in either the protected or unprotected memories.

Moreover, the message may be an over-the-air-activation message. The protected memory may contain a site for storing over-the-air activation messages.

Moreover, the message may be an over-the-airprogramming message having information regarding the bands of the authorized and unauthorized radio telecommunications service providers. The protected memory may contain a site for storing over-the-air programming messages.

BRIEF DESCRIPTION OF THE DRAWINGS

FIG. 2 is a block diagram of a mobile station or mobile communications device according to an embodiment of the present invention having a protected, permanent memory;

FIG. 3 is a block diagram of a mobile station or mobile communications device according to a further embodiment of the present invention having a permanent memory with protected and unprotected sections;

FIG. 6 is a flow chart illustrating a program according to a still further embodiment of the present invention for allowing messages from an authorized radio telecommunications service provider to be written into a protected memory of a mobile station or mobile communications device and messages from either authorized or unauthorized service providers to be written into an unprotected memory.

DETAILED DESCRIPTION OF THE PREFERRED EMBODIMENT

Figure 1:
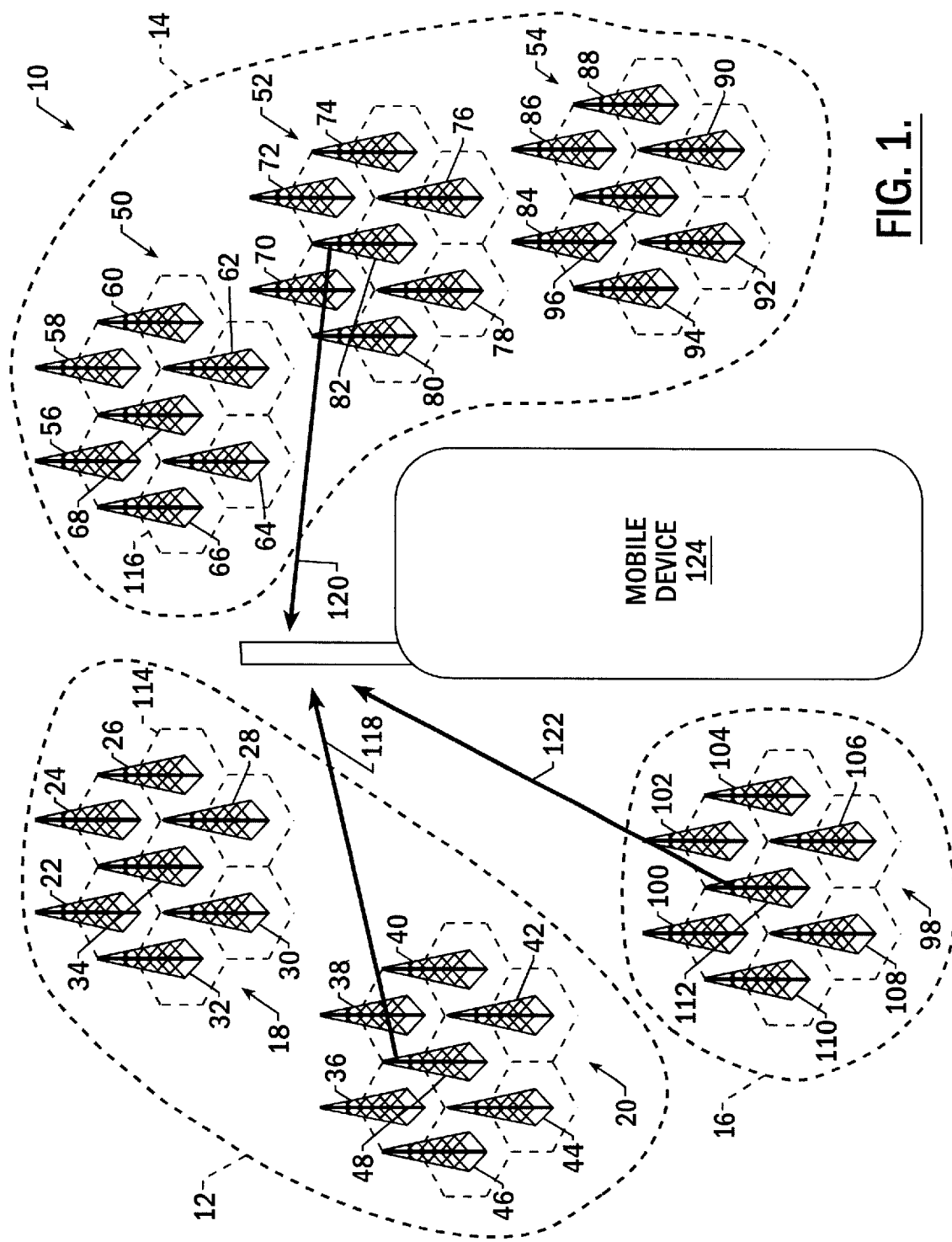
FIG. 1 is a schematic representation of a radio telecommunications system including a plurality of radio telecommunications service providers in communication with a mobile communications device.

With reference to FIG. 1, a radio telecommunications system 10 is shown. Within the radio telecommunications system 10 are a plurality of radio telecommunications service providers 12, 14, 16. Each of the service providers 12, 14, 16 may operate one or more radio telecommunications networks, each network being represented by a cell cluster. Each cell cluster has, in turn, a plurality of cells, each cell having base station represented by an antenna.

For example, as shown in FIG. 1, the service provider 12 has two radio telecommunications networks 18, 20, the network 18 having base stations 22, 24, 26, 28, 30, 32, 34 and the network 20 having base stations 36, 38, 40, 42, 44, 46, 48. Similarly, the service provider has three radio telecommunications networks 50, 52, 54, the network 50 having base stations 56, 58, 60, 62, 64, 66, 68, the network 52 having base stations 70, 72, 74, 76, 78, 80, 82 and the network 54 having base stations 84, 86, 88, 90, 92, 94, 96. Further, the service provider 16 has a network 98 with base stations 100, 102, 104, 106, 108, 110, 112.

While each of the radio telecommunications networks 18, 20, 50, 52, 54, 98 is shown separated spatially from the other radio telecommunications networks, it should be recognized that one radio telecommunications network, for example the radio telecommunications system 18, may overlap geographically with another radio telecommunications network, such as the radio telecommunications network 50. By way of example, a coverage area 114 of the base station 26 may overlap, in whole or in part, with a coverage area 116 of the base station 66.

It should also be recognized that messages transmitted by the service providers may be structured data messages, such as over-the-air activation messages or over-the-air programming messages, but that the messages referred to herein encompass any transmission of information in any form by the service providers.

It should further be recognized that the messages transmitted from the base stations within a predetermined telecommunications network of a predetermined service provider typically have identification codes associated therewith which are unique to the network and to the service provider. A message, represented by an arrow 118, transmitted from the base station 48 has one or more identification codes associated therewith which identify the message 118 as originating from within the network 20 and the service provider 12. Similarly, a message, represented by an arrow 120, has codes associated therewith identifying the network 52 and the service provider 14, and a message, represented by an arrow 122, has codes associated therewith identifying the network 98 and the service provider 16.

In the case of an over-the-air activation message, the code which can be used to identify the messages of a service provider with that service provider is known as a system operator code (SOC). In the case of an over-the-air programming message, and in particular an over-the-air programming message for use in selecting a service provider from among partner, favored and forbidden service providers, the specific service provider can be identified by the bands associated with the service provider which are used by the networks of that service provider across its coverage area. For example, for the service provider 12, the network 18 may use specific cellular bands a and b, and Personal Communications Service (PCS) bands A and C, while the network 20 may use the same cellular bands a, b and PCS band A, but PCS band D rather than band C because of an agreement reached with the service provider 14. In this case, messages from the networks 18 and 20 of the service provider 12 can be identified through the specific cellular bands a, b and PCS band A.

Also shown in FIG. 1 is a mobile station or mobile communications device 124. A first embodiment of the mobile communications device 124 is shown in greater detail in FIG. 2. The mobile communications device has an antenna 126 and a transmitter/receiver assembly 128 coupled thereto to receive messages 118, 120, 122 from the service providers 12, 14, 16. The messages 118, 120, 122 are transferrable from the transmitter/receiver assembly 128 to a data bus 130.

The mobile communications device 124 also has a programmable computational apparatus 132, a permanent (i.e. non-volatile) memory 134, and a core memory 136. The programmable computational apparatus 132 is used, according to the method of the present invention, to selectively control which of the messages 118, 120, 122 may be stored in the permanent memory 134.

The mobile communications device 124 also has a program which operates the programmable computational apparatus 132 to make a comparison between an identification code associated with the messages 118, 120, 122 and an identification code stored in the core memory 136 representative of a home system or service provider, such as the service provider 12. If it is determined that the identification code received with the message 118, for example, matches the identification code stored in the core memory 134 for the home system or service provider 12 (which in this case it does), then the message 118 is stored in the permanent memory 134 under the control of the programmable computational device 132.

Figure 5:
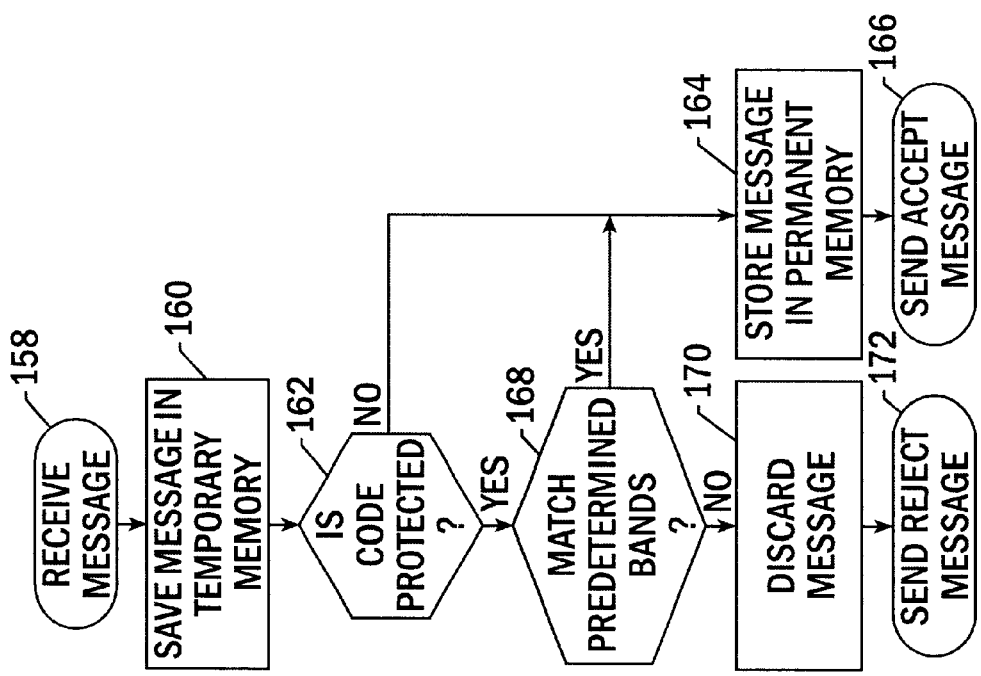
FIG. 5 is a flow chart illustrating a program according to a further embodiment of the present invention for allowing only over-the-air programming messages from an authorized radio telecommunications service provider to be written into a protected memory of a mobile station or mobile communications device while rejecting other messages.

The structure and operation of the first embodiment of the present invention is now discussed in greater detail. In addition to the antenna 126, the transmitter/receiver 128, the programmable computational apparatus 132, the data bus 130, the permanent memory 134, and the core memory 136, the mobile communications device 124 includes a temporary (volatile) memory 138 and an input-output assembly 140. The data bus 130 is connected to the transmitter/receiver 128, the programmable computational device 132, the temporary memory 138, the permanent memory 134, the core memory 136 and the input-output assembly 140 as shown in FIG. 2 so that data can be transferred between these elements in accordance with a program operating in the programmable computational apparatus 132. The program operates the programmable computational apparatus 132 as shown in FIGS. 4 and 5.

Figure 4:
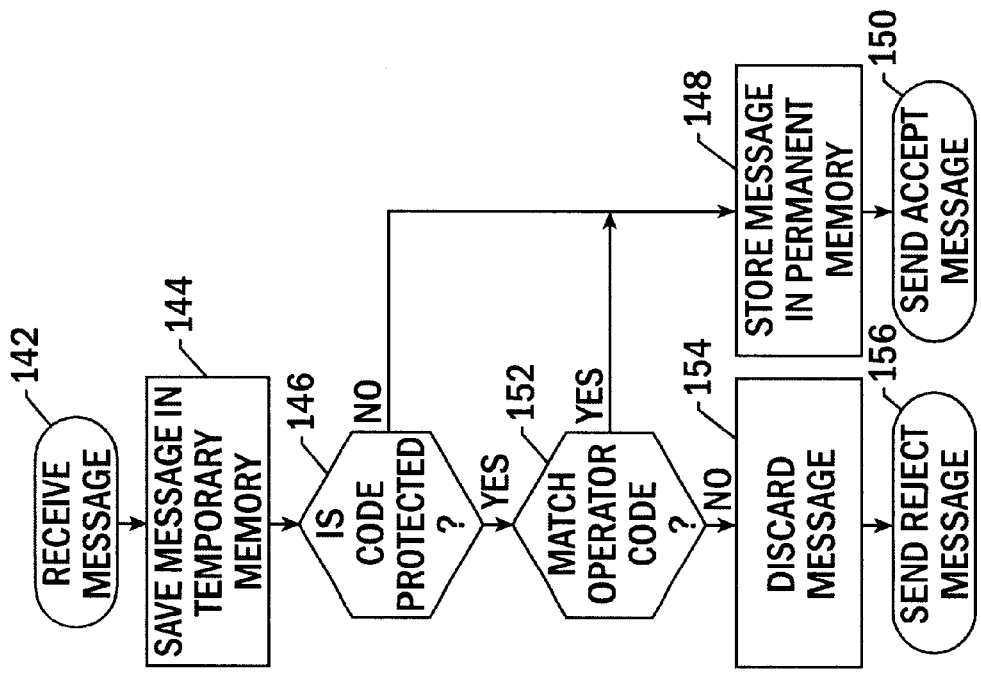
FIG. 4 is a flow chart illustrating a program according to an embodiment of the present invention for allowing only over-the-air activation messages from an authorized radio telecommunications service provider to be written into a protected memory of a mobile station or mobile communications device while rejecting other messages.

FIG. 4 illustrates a program according to the present invention for preventing an over-the-air activation teleservice (OATS) message sent by an unauthorized radio telecommunications system from being stored in the permanent memory 134. At block 142, a message is received by the mobile communications device 124 from one of the radio telecommunications service providers of the radio telecommunications system 10. At block 144, the OATS message received by the mobile telecommunications device 124 is stored in the temporary memory 138. At block 146, the programmable computational apparatus 132 determines whether the permanent memory 134 is code-protected, i.e. whether the security system is activated. According to the present invention, the security system may be activated by the service provider when the mobile communications device 124 is assembled and programmed, or later by the service provider when the mobile communications device is provided to the subscriber, or may even be an option which the subscriber may select through the use of the input-output assembly 140.

If the programmable computational apparatus 132 determines at block 146 that the code-protection has not been selected, then at block 148 the programmable computational apparatus 132 allows the message stored in the temporary memory 138 to be stored in the memory 134. The programmable computational apparatus 132 then sends at block 150 an accept-message signal via the antenna 126 and the transmitter/receiver assembly 128 to the radio telecommunications network 10 indicating that the message which the mobile communications device 124 received has been stored in the permanent memory 134.

Alternatively, if the programmable computational apparatus 132 determines that the permanent memory 134 is code-protected at block 146, then the programmable computational apparatus 132 accesses the temporary memory 138 and the core memory 136. As the message received was an OATS message, the programmable computational device 132 retrieves the system operator code (SOC) associated with the data message stored in temporary memory 138 and compares it with the SOC for the home system stored in the core memory 136.

If the SOC associated with the message stored in the temporary memory 138 matches the SOC stored in the core memory 136, then the programmable computational apparatus 132 allows the message stored in the temporary memory 138 to be transferred to and stored in the permanent memory 134 at block 148. At block 150, an accept-message signal is then sent as before.

If, however, the SOC associated with the message stored in the temporary memory 138 does not match the SOC stored in the core memory 136, then at block 154 the programmable computational apparatus 132 allows the message to be discarded. That is, the message is not transferred and stored in permanent memory 134, but may be allowed to remain in the temporary memory 138 until the message is overwritten, or the mobile communications device 124 is turned off. If the data message is to be discarded at block 154, then at block 156 the programmable computational apparatus 132 sends a signal via the antenna 126 and transmitter/receiver assembly 128 to the radio telecommunications network 10 that the message was rejected.

FIG. 5 illustrates a program according to the present invention for preventing an over-the-air programming teleservice (OPTS) message (in particular an over-the-air programming message for use in selecting a service provider from among partner, favored and forbidden service providers) sent by an unauthorized radio telecommunications system from being stored in the protected memory 134. At block 158, an OPTS message is received by the mobile communications device from one of the radio telecommunications service providers of the radio telecommunications system 10. At block 160, the OPTS message received by the mobile telecommunications device 124 is stored in the temporary memory 138. At block 162, the programmable computational apparatus 132 determines whether the permanent memory 134 is code-protected, i.e. whether the security system is activated. According to the present invention, the security system may be activated by the service provider when the mobile communications device 124 is assembled and programmed, or later by the service provider when the mobile communications device 124 is provided to the subscriber, or may even be an option which the subscriber may select through the use of the input-output assembly 140.

If the programmable computational apparatus 132 determines at block 162 that the code-protection has not been selected, then at block 164 the programmable computational apparatus 132 allows the message stored in the temporary memory 138 to be stored in the permanent memory 134. The programmable computational apparatus 132 then sends at block 166 an accept-message signal via the antenna 126 and the transmitter/receiver assembly 128 to the radio telecommunications network 10 indicating that the message which the mobile communications device 124 received has been stored in the permanent memory 134.

Alternatively, if the programmable computational apparatus 132 determines that the permanent memory 134 is code-protected at block 162, then the programmable computational apparatus 132 accesses the temporary memory 138 and the core memory 136. As the message received was an OPTS message, the programmable computational device 132 retrieves the values of a predetermined sequence of bands associated with the data message stored in temporary memory 138 and compares them with the values for the predetermined sequence of bands associated with the home system throughout the home system coverage area which were stored in the core memory 136. As indicated above, the predetermined sequence of bands may be selected from cellular a, cellular b, and PCS A–F. Most preferably, the predetermined sequence of bands is made up of three bands, in particular the cellular a, cellular b, and PCS A bands.

If the values of the predetermined sequence of bands associated with the message stored in the temporary memory 138 match the values for the predetermined sequence of bands stored in the core memory 136, then the programmable computational apparatus 132 allows the message stored in the temporary memory 138 to be transferred to and stored in the permanent memory 134 at block 164. An accept signal message is then sent at block 166.

If, however, the values for the bands associated with the message stored in the temporary memory 138 do not match the values of the bands stored in the core memory 136, then at block 170 the programmable computational apparatus 132 allows the message to be discarded. If the data message is to be discarded at block 170, then at block 172 the programmable computational apparatus 132 sends a signal via the antenna 126 and transmitter/receiver assembly 128 to the radio telecommunications network 10 that the message was rejected.

Having discussed code-protection for both OATS and OPTS messages, it should be recognized that the mobile communications device 124 may have code-protection for both OATS and OPTS messages, either OATS or OPTS messages, or neither OATS nor OPTS messages. Moreover, it should also be recognized that while the discussion above highlights the utility of the present invention with respect to messages transmitted from radio telecommunications service providers to the mobile communications device 124 over-the-air, the security method according to the present invention could be used with messages that are received from the radio telecommunications service providers, for example, through the input/output assembly 140. For example, messages could be communicated to the mobile communications device 124 by attaching a cable to the data bus 130 of the mobile communications device 124 via the input/output assembly 140 and downloading thereby messages from the radio telecommunications service provider stored, for example, in a data storage apparatus in a form readable by the programmable computational apparatus 132.

The system and method according to the present invention are now discussed with reference to messages 118, 120, the security system being activated, the messages 118, 120 being OATS messages, the service provider 12 being the home system operator and service provider 14 being a competitor. First, the message 118 is received by the mobile communications device 124 from the radio telecommunications service provider 12 at block 142. At block 144, the OATS message 118 is stored in the temporary memory 138.

At block 146, the programmable computational apparatus 132 determines whether the protected memory is code-protected, i.e. whether the security system is activated. As the security system has been activated, then the programmable computational apparatus 132 accesses the temporary memory 138 and the core memory 136 at block 152. The programmable computational device 132 retrieves the system operator code (SOC) associated with the data message 118 and compares it with the SOC for the home system operator 12 stored in the core memory 136. As the SOC associated with the message stored in the temporary memory 138 matches the SOC stored in the core memory 136, the programmable computational apparatus 132 allows the message 118 stored in the temporary memory 138 to be transferred to and stored in the permanent memory 134 at block 148. An accept-message signal (block 150) is sent.

Alternatively, if the message 120 was received, then program would follow the same steps of storing the message 120 in temporary memory 138 (block 144), checking to see that the security system is activated (block 146), and comparing the SOC codes (block 152). However, as the SOC associated with the message 120 does not match the SOC stored in the core memory 136, then at block 154 the programmable computational apparatus 132 allows the message 120 to be discarded. At block 156, the programmable computational apparatus 132 sends a signal via the antenna 126 and transmitter/receiver assembly 128 to the radio telecommunications network 10 that the message was rejected.

Alternatively, the system and method according to the present invention may be discussed with reference to messages 118, 120, the security system being activated, the messages 118 and 120 being OPTS messages, the service provider 12 being the home system operator and service provider 14 being a competitor. First, the message 118 is received by the mobile communications device 124 from the radio telecommunications service provider 12 at block 158. At block 160, the OPTS message 118 is stored in the temporary memory 138.

At block 162, the programmable computational apparatus 132 determines whether the protected memory is code-protected, i.e. whether the security system is activated. As the security system has been activated, then the programmable computational apparatus 132 accesses the temporary memory 138 and the core memory 136 at block 168. The programmable computational device 132 retrieves the values for a predetermined sequence of bands associated with the data message 118 and compares them with the values for the predetermined sequence of bands for the home system operator 12 stored in the core memory 136. As the values of the bands associated with the message stored in the temporary memory 138 match the values for the bands stored in the core memory 136, the programmable computational apparatus 132 allows the message 118 stored in the temporary memory 138 to be transferred to and stored in the permanent memory 134 at block 164. An accept message signal is sent at block 166.

Alternatively, if the message 120 was received, then the program would follow the same steps of storing the message 120 in temporary memory 138 (block 160), checking to see that the security system is activated (block 162), and comparing the band values (block 168). However, as the values of the predetermined sequence of bands associated with the message 120 do not match the values of values of the predetermined sequence of bands stored in the core memory 136, then at block 170 the programmable computational apparatus 132 allows the message to be discarded. At block 172, the programmable computational apparatus 132 sends a signal via the antenna 126 and transmitter/receiver assembly 128 to the radio telecommunications network 10 that the message was rejected.

As still further alternative, wherein the message 122 is received from a competitor service provider 16 and the permanent memory 134 is not code-protected for either OATS messages or OPTS messages, the programs would follow the same steps of storing the message (block 144 or block 160) and checking to see if the permanent memory was code-protected (block 146 or 162). However, finding that the permanent memory 134 was not code-protected, the program would allow the data message to be stored in the permanent memory 134 (block 148 or 164) and send an accept-message signal (block 150 or 166).

According to another embodiment of the present invention, as shown in FIG. 3, the mobile communications device includes an antenna 174, a transmitter/receiver assembly 176, a data bus 178, a programmable computational apparatus 180, a temporary memory 182, a permanent memory 184 with an unprotected section 186 and a protected section 188, a core memory 190, and an input-output assembly 192. The transmitter/receiver assembly 176, the programmable computational apparatus 180, the temporary memory 182, the permanent memory 184, the core memory 190, and the input-output assembly 192 are connected to the data bus 178 so that data can be transferred between these elements in accordance with a program operating in the programmable computational apparatus 180 which operates the programmable computational apparatus 180 as shown in FIG. 6.

The program illustrated in the flow chart of FIG. 6 is substantially similar to either of the programs shown in FIGS. 4 and 5. At block 194, a message is received by the mobile communications device 124. The message is stored in the temporary memory 182 at block 196.

Because the permanent memory 184 of the mobile communications device 124 shown in FIG. 3 is divided into unprotected and protected sections, i.e. some sections of the memory 184 are not subject to code-protection, the programmable computational device determines at block 198 whether the message is addressed to go to the unprotected memory 186 or the protected memory 188. If the message is addressed to the unprotected memory 186, then the programmable computational device 180 transfers the message from the temporary memory 182 to the permanent memory 184 at block 200. An accept-message signal is then sent at block 202.

If, however, it is determined that the message is addressed to the protected memory 188 of the permanent memory 184, then the programmable computational apparatus 180 checks to see if the code-protection has been activated at block 204. As described above, if the programmable computational apparatus 180 determines that the code-protection is not activated, then the message is stored in the protected memory section 188 of the permanent memory 184 (block 200) and the accept-message signal is sent (block 202).

If it is determined at block 204 that the protected memory section 188 is code-protected, then at block 206 the programmable computation device 180 accesses the temporary memory 182 and the core memory 190, retrieves the codes associated with the message and the home system operator (whether those are SOC codes for OATS messages, values of a predetermined sequences of bands for OPTS messages, or some other code), and determines if the codes match. If the codes match, then the message is transferred from the temporary memory 182 to the permanent memory 184 at block 200. If the codes do not match, then the message is discarded at block 208 and the reject-message signal is communicated at block 210 to the radio telecommunications system 10.

Still other aspects, objects, and advantages of the present invention can be obtained from a study of the specification, the drawings, and the appended claims.

We claim:

1. A method of message management for use with a mobile communications device having a core memory and a protected memory, the mobile communications device in communication with a radio telecommunications system comprised of an authorized radio telecommunications system operator and an unauthorized radio telecommunications system operator, the authorized and unauthorized radio telecommunications system operators each having a unique identification code which is associated with messages communicated therefrom, the method comprising the steps of:

storing the identification code of the authorized radio telecommunications system operator in the core memory of the mobile communications device;

receiving at the mobile communications device a first message to be stored in the protected memory of the mobile communications device with an identification code associated therewith from the radio telecommunications system;

comparing at the mobile communications device the identification code of the first message with the identification code of the authorized radio telecommunications system operator stored in the core memory of the mobile communications device if the first message is to be stored in the protected memory; and storing the first message in the protected memory of the mobile communications device only if the identification code of the first message matches the identification code of the authorized radio telecommunications system operator.

2. The method according to claim 1, further comprising the step of transmitting a reject-message signal to the radio telecommunications system if the first message is not stored in the protected memory.

3. The method according to claim 1, wherein the mobile communications device has an unprotected memory, further comprising the steps of:
   determining if a received message is a first message to be stored in the protected memory or a second message to be stored in the unprotected memory;
   storing the received message in the unprotected memory if the received message is said second message to be stored in the unprotected memory.

4. The method according to claim 3, further comprising the step of transmitting an accept-message signal to the radio telecommunications network if the received message is stored in either the protected memory or the unprotected memory.

5. The method according to claim 1, wherein the first message is an over-the-air-activation message and the identification code associated with the first message is a system operator code identifying either an authorized or an unauthorized radio telecommunications system operator.

6. The method according to claim 1, wherein the first message is an over-the-air-programming message having information regarding the bands of authorized and unauthorized radio telecommunications service providers and the identification code associated with the first message are the values of a predetermined sequence of bands representative of an authorized or an unauthorized radio telecommunications system operator.

7. The method according to claim 1, wherein the mobile communications device further comprises a temporary memory and wherein the step of receiving further comprises storing the first message in the temporary memory.

8. The method according to claim 7, further comprising the step of:
   discarding the first message if the identification code of the first message does not match the identification code of the authorized radio telecommunications system operator.

9. The method according to claim 7, wherein the first message remains in the temporary memory if the identification code of the first message does not match the identification code of the authorized radio telecommunications system operator until the first message is overwritten or the mobile communications device is turned off.

10. A mobile communications device for use with a radio telecommunications system, the radio telecommunications system comprised of an authorized radio telecommunications system operator and an unauthorized radio telecommunications system operator, the authorized and unauthorized radio telecommunications system operators each having a unique identification code which is associated with messages communicated therefrom, the mobile communications device comprising:
   a receiver to receive messages from a radio telecommunications network;
   a core memory with an identification code stored therein, the identification code associated with an authorized radio telecommunications system operator;
   a protected memory for storing first messages;
   a programmable computational apparatus coupled to the receiver and the core memory; and
   a message management program operating in the programmable computational apparatus, wherein the message management program controls the programmable computational apparatus to compare an identification code of a message received by the receiver with the identification code of the authorized radio telecommunications system operator stored in the core memory if the message is to be stored in the protected memory and to store the message in the protected memory only if the identification code of the message matches the identification code of the authorized radio telecommunications system operator stored in the core memory.

11. The mobile communications device according to claim 10, further comprising an unprotected memory for storing second messages, wherein the message management program controls the programmable computational apparatus to determine if a message is a first message to be stored in the protected memory or a second message to be stored in the unprotected memory and to store a second message in the unprotected memory if the programmable computational apparatus determines that the received message is a second message to be stored the unprotected memory.

12. The mobile communications device according to claim 11, further comprising a transmitter to transmit an accept-message signal to the telecommunications system, wherein the data management program controls the programmable computational apparatus to provide an accept-message signal to the transmitter if the message is stored in either the protected or unprotected memories.

13. The mobile communications device according to claim 10, wherein the first message is an over-the-air-activation message and the protected memory contains a site for storing over-the-air activation messages.

14. The mobile communications device according to claim 10, wherein the first message is an over-the-air-programming message having information regarding the bands of the authorized and unauthorized radio telecommunications service providers and the protected memory contains a site for storing over-the-air programming messages.

15. The mobile communications device according to claim 10, further comprising a temporary memory to store messages from the authorized and unauthorized radio telecommunications system operators temporarily.

16. The mobile communications device according to claim 15, wherein the first message is discarded if the identification code of the first message does not match the identification code of the authorized radio telecommunications system operator.

17. The mobile communications device according to claim 15, wherein the first message remains in the temporary memory if the identification code of the first message does not match the identification code of the authorized radio telecommunications system operator until the first message is overwritten or the mobile communications device is turned off.

* * * * *